United States Patent [19]

Tokumitsu

[11] Patent Number: 4,558,246

[45] Date of Patent: * Dec. 10, 1985

[54] LIQUID-SEAL TYPE MOTOR HAVING INSULATING OIL PRESSURE COMPENSATION

[75] Inventor: Kiyonori Tokumitsu, Fukuoka, Japan

[73] Assignee: Mitsubishi Denki Kabushiki Kaisha, Tokyo, Japan

[*] Notice: The portion of the term of this patent subsequent to Dec. 10, 2002 has been disclaimed.

[21] Appl. No.: 632,116

[22] Filed: Jul. 18, 1984

[30] Foreign Application Priority Data

Jul. 28, 1983 [JP] Japan .................. 58-139763
Jul. 28, 1983 [JP] Japan .................. 58-139764
Jul. 28, 1983 [JP] Japan .................. 58-139766

[51] Int. Cl.$^4$ .......................... H02K 5/10
[52] U.S. Cl. ........................ 310/87; 417/414
[58] Field of Search ........... 310/86, 90, 87, 157, 310/88, 85; 417/414, 424

[56] References Cited

U.S. PATENT DOCUMENTS

| | | | |
|---|---|---|---|
| 2,002,907 | 5/1935 | Sessions | 417/414 |
| 2,687,695 | 8/1954 | Blom | 310/87 |
| 2,829,288 | 4/1958 | Schaefer | 310/87 |
| 2,887,061 | 5/1959 | Cametti | 310/87 |
| 3,072,810 | 1/1963 | Luenberger | 310/87 |
| 3,116,432 | 12/1963 | Ekey | 310/87 |
| 3,135,884 | 6/1964 | Luenberger | 310/87 |
| 3,209,183 | 9/1965 | Bollibon | 310/87 |

Primary Examiner—R. Skudy
Attorney, Agent, or Firm—Oblon, Fisher, Spivak, McClelland & Maier

[57] ABSTRACT

A liquid-seal type motor comprising a cylindrical frame, a stator fixed inside the frame, a can placed at the inner circumferential side of the stator, a pair of end plates placed at both ends of and between the frame and the can to be sealingly connected thereto to thereby form an insulating oil enclosing part in which the stator is confined, a pair of brackets connected to the pair of the end plates respectively and a rotor placed in the can to be journaled by the brackets. The can, the brackets and the rotor define a lubricating oil enclosing part. A pressure adjusting means has a flexible member for sealingly defines the insulating oil enclosing part into two parts and an oil volume reducing member is provided in the insulating oil enclosing part.

8 Claims, 9 Drawing Figures

LIQUID-SEAL TYPE MOTOR HAVING INSULATING OIL PRESSURE COMPENSATION

BACKGROUND OF THE INVENTION

1. Field of the Invention

The present invention relates to an improvement in a liquid-seal type motor in which a rotor section is filled with a lubricating oil and a stator section is filled with an insulating oil.

2. Description of the Prior Art

A conventional liquid-seal type motor will be described with reference to FIG. 1. In FIG. 1, there is shown a cylindrical frame 1. A stator 2 is fixed onto the inner circumferential surface of the frame 1 and a cylindrically formed can 3 is arranged at the inner side of the stator 2. Upper and lower annular end plates 4, 5 are respectively placed at upper and lower ends of and between the can 3 and the frame 1 to be sealingly connected to them. Upper and lower brackets 6, 7 are sealingly connected to the upper and lower end plates 4, 5 respectively. The upper bracket 6 receives in its axial bore an upper bearing 8 to journal the upper part of a rotary shaft 14 on which a rotor 12 is fixed and a communication channel 10 is formed in the axial bore of the upper bracket 6 extending over the entire length of the upper bearing 8. The lower bracket 7 also receives in its axial bore a lower bearing 9 to journal the lower part of the rotary shaft 14 and a communication channel 11 is formed in the axial bore of the lower bracket 7 passing through the same. A shaft sealing device 13 is arranged in the upper bracket 6 to seal the upper end of the rotary shaft 12. The lower bracket 7 is attached at its lower end with a thrust casing 15 which has upper and lower cylindrical parts and an intermediate wall portion 16 at the center of which a through hole 17 is formed. A thrust bearing 18 is supported by the intermediate wall portion 16 to bear a thrust load of the rotary shaft 14. A diaphragm 19 is sealingly fitted to the lower cylindrical recess of the thrust casing 15 to adjust a pressure of lubricating oil filled inside the can 3, the pressure being applied through the communication channel 11 and the through hole 17. A current feeding cable 20 is sealingly connected to the upper bracket 6 to extend to the stator 2.

The cylindrical frame 1, the can 3 and the end plates 4, 5 cooperate to define an insulating oil enclosing part B in which the stator 2 is surrounded by insulating oil, while the can 3, the upper and lower brackets 6, 7 and the rotor 12 cooperate to define a lubricating oil enclosing part A in which the rotor 12 is surrounded by lubricating oil.

In the conventional liquid-seal type motor as described above, when a current is supplied to the stator 2 through the current feeding cable 20, the rotor 12 is rotated to drive a pump (not shown) and so forth connected to the rotary shaft 14 as is well-known.

The operation of the motor causes temperature rise in the stator 2 and the rotor 12 to cause volume expansion of the lubricating oil and the insulating oil contained in the motor. In this case, the frame 1, the can 3 and the upper and lower end plates 4, 5 are jointed by welding at their adjoining parts and accordingly, the insulating oil is certainly enclosed and does not leak outside. On the other hand, the lubricating oil tends to leak out because the rotary shaft 14 passes through the upper bracket 6 even though the shaft sealing device 13 is provided. However, since the diaphragm 19 is sealingly connected to the thrust casing 15, volume expansion of the lubricating oil is absorbed by deformation of the diaphragm 19 through the communication cannel 11 and the through hole 17 to thereby prevent pressure rise in the lubricating oil enclosing part A, i.e., increase of a pressure applied to the rotor 12.

When a liquid-seal type motor is used at a high pressure and high temperature, the volume expansion of the lubricating oil and the insulating oil is extremely large. Especially, a pressure in the insulating oil enclosing part B in which the stator 2 is confined becomes high since the insulating oil is completely sealed by the frame 1, the can 3 and the upper and lower end plates 4, 5. As a result, a high pressure is applied to the can 3 formed of a thin plate to thereby cause deformation of the can 3 on the side of the rotor 12. The deformation of the can 3 may cause a serious accident that the can 3 restricts the revolution of the rotor 12 or the joint portions between the upper and lower end plates 4, 5 are broken.

SUMMARY OF THE INVENTION

It is an object of the present invention to eliminate the disadvantage of the conventional device and to provide a liquid-seal type motor capable of absorbing an inner pressure produced in an insulating oil enclosing part and reducing an amount of insulating oil to be enclosed therein.

The foregoing and the other objects of the present invention have been attained by providing a liquid-seal type motor comprising a cylindrical frame, a stator fixed inside the frame, a can placed at the inner circumferential side of the stator, a pair of end plates placed at both ends of and between the frame and the can to be sealingly connected thereto to thereby form an insulating oil enclosing part in which the stator is confined, a pair of brackets connected to the pair of the end plates respectively and a rotor placed in the can to be journaled by the brackets, said can, brackets and rotor defining a lubricating oil enclosing part, characterized in that a pressure adjusting means having a flexible member for sealingly defining the insulating oil enclosing part into two parts and an oil volume reducing member is provided in the insulating oil enclosing part.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENT

Figure 1:
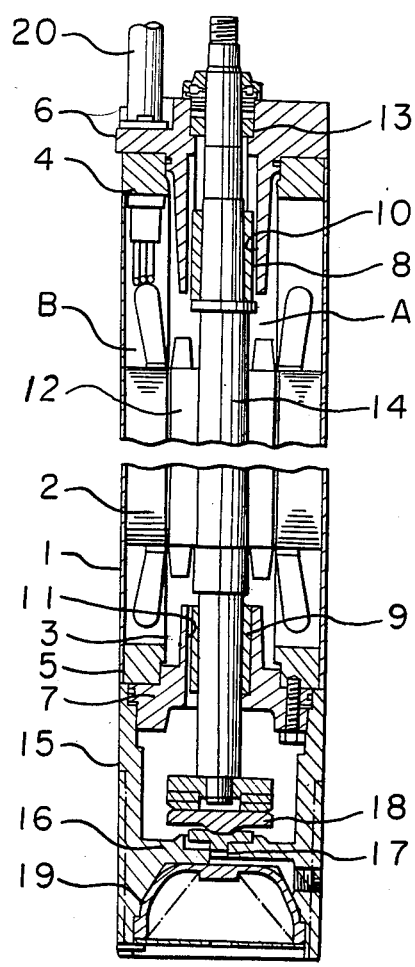
FIG. 1 is a longitudinally cross-sectional view of a conventional liquid-seal type motor.
Figure 2:
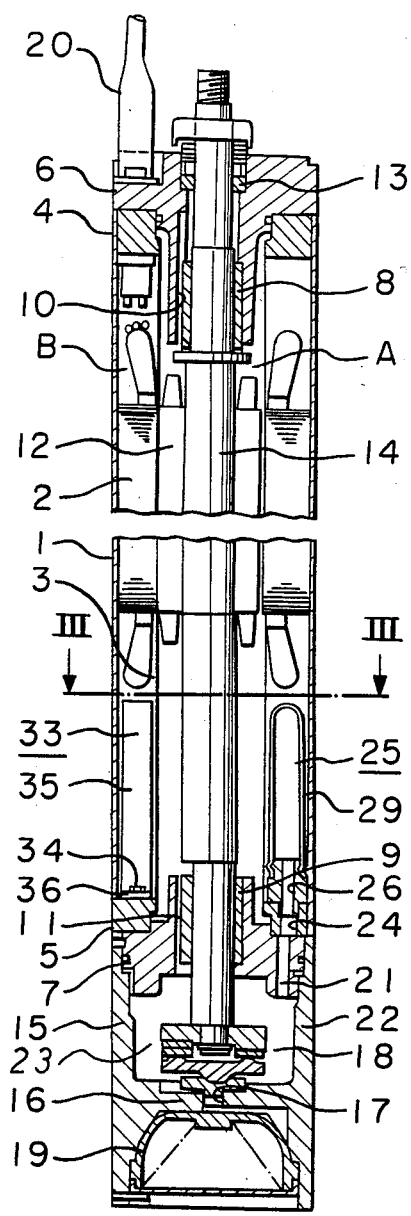
FIG. 2 is a longitudinally cross-sectional view of a first embodiment of the liquid-seal type motor according to the present invention.

Several embodiments of the present invention will be described with reference to drawing in which the same reference numerals designate the same or corresponding parts.

FIGS. 2 to 5 show a first embodiment of the present invention. In the figures, a conduit 21 is formed in the lower bracket 7 in the vertical direction, the lower part of the conduit being opened to a chamber 23 in the upper cylindrical part 22 of the thrust casing 15. A communicating passage 24 is formed in the lower end plate 5 passing through in the vertical direction to communicate with the conduit 21. There is provided in the insulating oil enclosing part B a plurality of pressure adjusting means each comprising a casing 25 and a flexible member 31. The casing 25 comprises a fitting part 27 having a through hole 26 connected to the communicating passage 24 and a threaded portion which is engaged with the communicating passage 24 and a rigid cylindrical body 29 whose lower open end is sealingly connected to the fitting part 27 and whose upper part extending in the axial direction and between the frame 1 and the can 3 and a small apeature 28 is formed in the top of the cylindrical body 29. The flexible member 31 in a cylindrical form is received in the rigid cylindrical body 29 and has the lower end sealingly connected to the fitting part 27 while having the upper part entirely closed to form a chamber 32 communicated with the through hole 26 and sealed from a chamber defined by the remainder of the insulating oil enclosing part B.

Figure 3:
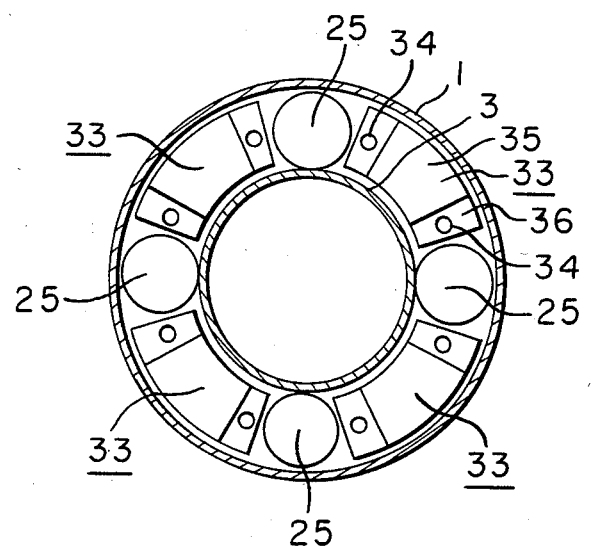
FIG. 3 is a cross-sectional view taken along the line III—III in FIG. 2.
Figure 4:
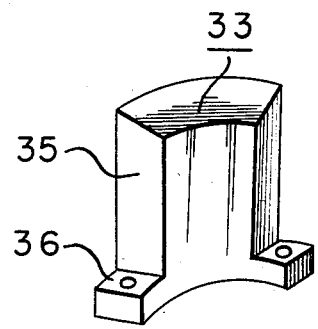
FIG. 4 is a perspective view of an embodiment of a block member according to the present invention.

As shown in FIG. 3, 4 numbers of the casings 25 are connected to the lower end plate 5 in a symmetrical position with respect to the axial center of the motor and 4 numbers of blocks 33 made of metal are fixed to the lower end plate 5 between the casings 25 with screws 34. Each of blocks 33 comprises a body 35 of a sector in cross section and a pair of legs 36 at the lower part of the body.

In the embodiment, when the volume of the insulating oil in the insulating oil enclosing part B is largely expanded due to a temperature rise, an amount of the oil increased by the expansion flows into the casings 25 through the small apeature 28 in the casings 25 and forces the flexible member 31 received in each of the casings 25 downwardly. The flexible member 31 is compressed until a pressure in the insulating oil enclosing part B becomes substantially equal to a pressure in the lubricating oil enclosing part A because the chamber 32 of the flexible member 31 is communicated with the lubricating oil enclosing part A through the conduit 21, the communicating passage 24, the through hole 26, the chamber 23 and the communication channel 11. As a result, the pressure difference between the inside and outside of the can 3 is substantially eliminated and deformation of the can 3 on the side of the rotor 12 is prevented. In this case, the flexible member 31 contracts both in the axial and radial directions when compressed. When the flexible member 31 tends to deflect in the radial direction, direct contact of the flexible member 31 to the can 3 is prevented because the flexible member 31 is enclosed in the casing 25.

On the other hand, blocks 33 are arranged, in the spaces between the casings 25 to occupy substantial parts of the spaces whereby an amount of the insulating oil to be filled in the insulating oil enclosing part B is reduced.

Figure 6:
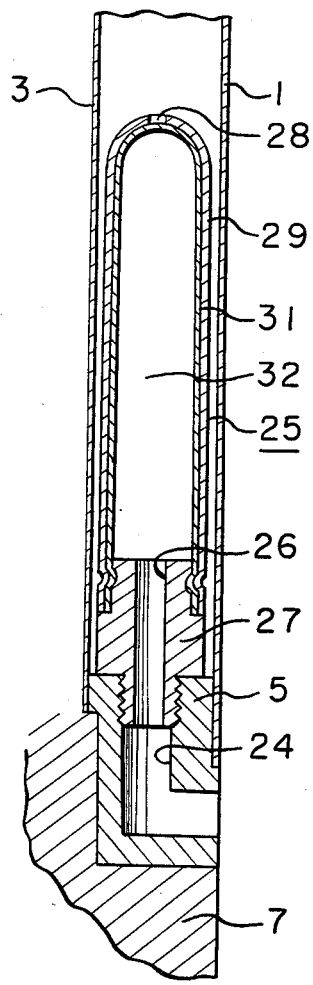
FIG. 6 is an enlarged longitudinally cross-sectional view of an important part of a second embodiment of the present invention.
Figure 5:
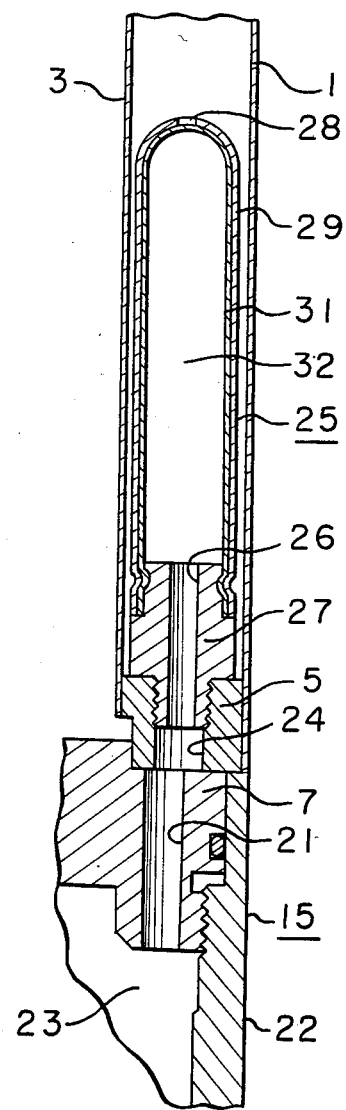
FIG. 5 is an enlarged longitudinally cross-sectional view of an important part in FIG. 2.

FIG. 6 shows a second embodiment which is a modification of the first embodiment, in which the communicating passage 24 is opened at the outside of the frame 1. With this construction, the insulating oil enclosing part B is always kept at the atmospheric pressure and the same effect as in the first embodiment can be obtained.

In the first and second embodiments, the pressure adjusting means are connected to the lower end plate 5. It is, however, possible to connect the pressure adjusting means to the frame 1. In this case, the blocks 33 are also connected to the frame 1.

The same effect as in the first and second embodiments can be obtained by using the blocks 33 having a hollowed portion. In this case, the weight of the device can be reduced.

Thus, the first and second embodiments of the present invention comprises a plurality of pressure adjusting means each having a flexible member for sealingly defining the insulating oil enclosing part into two parts and a plurality of oil volume reducing members in a form of metallic block arranged between the pressure adjusting means and connected to the end plate or the frame. With the construction, pressure rise in the insulating oil enclosing part can be controlled and an amount of insulating oil can be reduced by placing the blocks in spaces between a plurality of the pressure adjusting means to thereby control volume expansion of the insulating oil.

Figure 7:
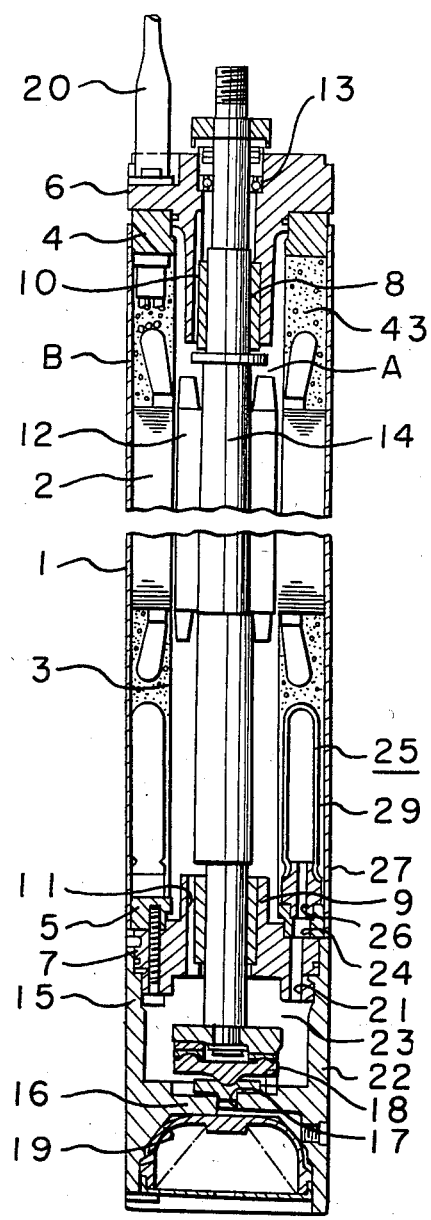
FIG. 7 is a longitudinally cross-sectional view of a third embodiment of the present invention.
Figure 8:
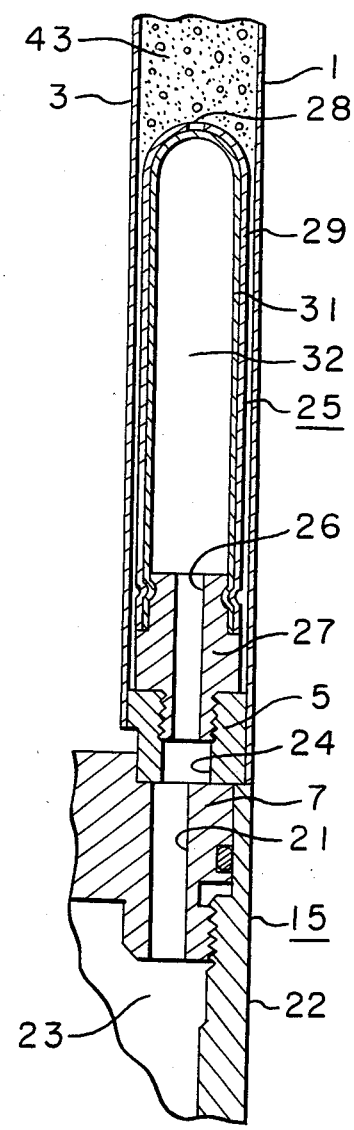
FIG. 8 is an enlarged cross-sectional view of an important part in FIG. 7.

A third embodiment of the present invention will be described with reference to FIGS. 7 and 8 in which the same reference numerals as in FIGS. 2 to 6 designate the same or corresponding parts. In the embodiment, arrangement of structural elements is the same as that of the first and second embodiments provided that foamed plastics 43 having insulating property is filled around the coil end of the stator 22 as an oil volume reducing member instead of the blocks 33. On account of this, an amount of the insulating oil to be filled in the insulating oil enclosing part can be largely reduced and volume expansion of the insulating oil due to temperature rise in the stator 2 can be controlled, with the result that a small-sized flexible member 31 can be used. The foamed plastics 43 thus used allows the insulating oil to pass therethrough to improve cooling function to the stator 2.

Figure 9:
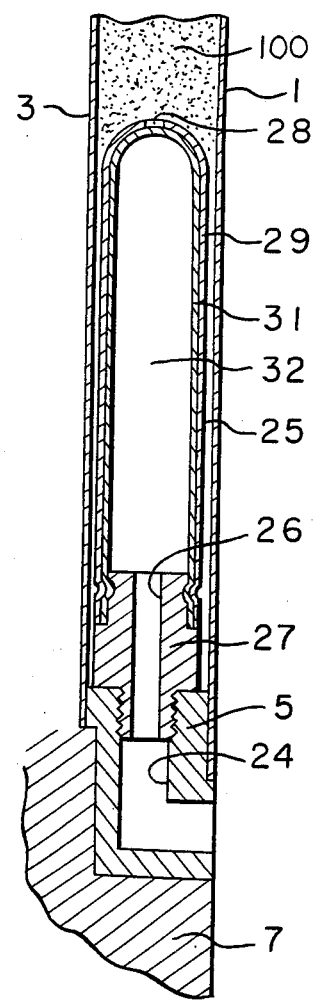
FIG. 9 is an enlarged cross-sectional view of a fourth embodiment of the present invention.

FIG. 9 shows a fourth embodiment of the present invention in which a plurality of the pressure adjusting means are received in the insulating oil enclosing part B receiving therein a stator around which the foamed plastics 43 is filled. The interior of the pressure adjusting means is communicated with the outside of the frame 1 through the communicating passage 24 whereby the a pressure the insulating oil enclosing part B becomes equal to the atmospheric pressure; thus, the same effect can be obtained.

It is possible to fill insulating particles 100 (FIG. 9) around the coil end of the stator 2 instead of the foamed plastics 43 to obtain the same effect. As the insulating particles, beads of inorganic material can be used to reduce an amount of the insulating oil to be filled in the insulating oil enclosing part B, with the result that volume expansion of the insulating oil can be small. Further, insulating particles act as a heat transmitting medium so that heat is transmitted to the frame to thereby control temperature rise in the stator.

Obviously, numerous modifications and variations of the present invention are possible in light of the above teachings. It is therefore to be understood that within the scope of the appended claims, the invention may be practiced otherwise than as specifically described herein.

I claim:

1. A liquid-seal type motor comprising a cylindrical frame, a stator fixed inside said frame, a can placed at the inner circumferential side of said stator, a pair of end plates placed at both ends of and between said frame and said can to be sealingly connected thereto to thereby form an insulating oil enclosing part in which said stator is confined, a pair of brackets connected to the pair of said end plates respectively and a rotor placed in said can to be journaled by said brackets, said can, brackets and rotor defining a lubricating oil enclosing part, a pressure adjusting means having a flexible member for sealingly dividing said insulating oil enclosing part into first and second chambers, and an oil volume reducing member provided in said insulating oil enclosing part, wherein said pressure adjusting means comprises a casing which is fixed in said oil enclosing part and which has at its upper portion a small orifice and at its bottom an opening, and a sealed flexible member which is received in said casing to define the interior thereof as said second chamber communicated with a region exterior to said insulating oil enclosing part.

2. The liquid-seal type motor according to claim 1, wherein an end opening of said pressure adjusting means is communicated with said lubricating oil enclosing part through a communicating passage formed in one of said end plates and brackets.

3. The liquid-seal type motor according to claim 1, wherein an end opening of said pressure adjusting means is communicated with the atmosphere through an opening formed in one of said end plates.

4. The liquid-seal type motor according to claim 1, wherein a plurality of said pressure adjusting means is placed on said bracket located at the lower position in said insulating oil enclosing part and said oil volume reducing member is a plurality of blocks of a metallic material connected between adjacent ones of a plurality of said pressure adjusting means.

5. The liquid-seal type motor according to claim 4, wherein each of said metallic blocks has a recessed portion.

6. The liquid-seal type motor according to claim 1, wherein said oil volume reducing member is foamed plastics having insulating property which is filled around said stator.

7. The liquid-seal type motor according to claim 1, wherein said oil volume reducing member is insulating particles.

8. The liquid-seal type motor according to claim 7, wherein said insulating particles are beads of inorganic material.

* * * * *